US00RE41824E

(19) United States
(12) Reissued Patent
Takayanagi

(10) Patent Number: US RE41,824 E
(45) Date of Reissued Patent: Oct. 19, 2010

(54) PROCESS FOR PRODUCING A THIN DIE-CAST MOLDED ARTICLE OF AN ALUMINUM MATERIAL

(75) Inventor: Akira Takayanagi, Saitama (JP)

(73) Assignee: Pleiatech Corporation, Nishi-ku, Osaka-shi, Osaka (JP)

(21) Appl. No.: 11/225,842

(22) Filed: Sep. 14, 2005

Related U.S. Patent Documents

Reissue of:
(64) Patent No.: 6,619,369
Issued: Sep. 16, 2003
Appl. No.: 09/923,393
Filed: Aug. 8, 2001

(51) Int. Cl.
*B22D 27/00* (2006.01)
*B22C 3/00* (2006.01)

(52) U.S. Cl. ..... 164/55.1; 164/72; 164/133; 164/134; 164/113

(58) Field of Classification Search ..... 164/55.1, 164/72, 133, 134, 113, 305, 255, 410, 337, 164/267
See application file for complete search history.

(56) References Cited

U.S. PATENT DOCUMENTS

| | | | | | |
|---|---|---|---|---|---|
| 4,202,523 | A | * | 5/1980 | Radtke | 249/115 |
| 4,333,902 | A | * | 6/1982 | Hara | 264/320 |
| 5,370,171 | A | * | 12/1994 | Fields et al. | 164/312 |
| 6,619,369 | B2 | * | 9/2003 | Takayanagi | 164/55.1 |

FOREIGN PATENT DOCUMENTS

| | | | | |
|---|---|---|---|---|
| JP | 63-256251 | | | 10/1988 |
| JP | 2-42289 | | * | 9/1990 |
| JP | 05-285982 | | | 11/1993 |
| JP | 5-291324 | | | 11/1993 |
| JP | 6-154949 | | | 6/1994 |
| JP | 07-204782 | | | 8/1995 |
| JP | 8-144039 | A | * | 6/1996 |
| JP | 08-144039 | | | 6/1996 |
| JP | 9-85389 | | | 3/1997 |
| JP | 10-263783 | | | 10/1998 |
| JP | 11-010305 | | | 1/1999 |
| JP | 2000-24768 | A | * | 1/2000 |
| JP | 2000-024768 | | | 1/2000 |
| JP | 3100954 | | * | 8/2000 |
| JP | 2000-218357 | | | 8/2000 |

OTHER PUBLICATIONS

"Kata Gijutu," Nippon Die–Casting Kyokai, 1991 (Heisei 3), p. 44.*
"Netsushori," V. 4, Nippon Netsushori Gijutu Kyokai, 1964 (Showa 39), pp. 265–271.*
"Tokushuko," V. 37, Tokushuko Club, 1988 (Showa 63), pp. 76–78.*
"Chuzo Kogaku," V. 69, Nippon Chuzo Kogakukai, 1997 (Heisei 9), pp. 432–437.*
"Die–Casting Gijutsu Binran," Nikkan Kogyo Shimbun Co., Ltd., V. 165, 1965 (Showa 40), pp. 663 and 944.*
DC Fan Motor Sanace MC MPU, Air Conditioner Catalog 109P5412H8026, Catalog No. 657–5, 98.11.2DS, date unknown.

(Continued)

*Primary Examiner*—Kevin P Kerns
(74) *Attorney, Agent, or Firm*—Bacon & Thomas, PLLC

(57) ABSTRACT

A process for producing a thin die-cast molded article of an aluminum material having a portion having a thickness in the range of 0.4 to 1.2 mm using a mold having a gate having an opening of 0.2 mm or greater and the same as or smaller than the thickness of the portion of the molded article separated from a gate portion, members constituting the gate having been treated by nitrogenation at the surface. The thin die-cast molded article of an aluminum material can be produced efficiently with excellent flow of the melted metal of the aluminum material through the gate portion.

11 Claims, 1 Drawing Sheet

AMENDED

OTHER PUBLICATIONS

MPU Cooler San Ace MC 109P5412H8026, date unknown.
Kobayashi, Saburo: "Designing and production of die–cast mold", Dec. 24, 1993, The Nikkan Kogyo Shimbun, Ltd.) recites as follows: pp. 42 and 170.
"Die–cast technology manual" Feb. 28, 1965 (Showa 40), The Nikkan Kogyo Shimbun, Ltd p. 944.
"Special Steel" vol. 37, No. 1, Jan. 1, 1988, Special Steel Association of Japan, pp. 76–78.
"Die–cast technology manual" Feb. 28, 1965 (Showa 40), The Nikkan Kogyo Shimbun, Ltd. pp. 164–167.
"Die–cast technology manual" Feb. 28, 1965 (Showa 40), The Nikkan Kogyo Shimbun, Ltd. pp. 663–669.
H. H. Doehler: "Die Casting" Nov. 25, 1963 (Showa 38) The Nikkan Kogyo Shimbun, Ltd. pp. 66–71.
H. H. Doehler: "Die–Casting" Nov. 25, 1963 (Showa 38) The Nikkan Kogyo Shimbun, Ltd. pp. 308–309.
Kanno and Uehara: "Introduction to die–cast technology", Dec. 20, 1979 (Showa 54) The Nikkan Kogyo Shimbun, Ltd. pp. 140–143.
"Revised version Die–cast technician handbook" Jul. 1, 1997, National Die Casting Co–Operative Union, pp. 172–173.
"Foundry Engineering" vol. 69, No. 5, May 1997 (Heisei 9), Japan Foundry Engineering Society, pp. 432–437.
H. H. Doehler: "Die–Casting" Nov. 25, 1963 (Showa 38) The Nikkan Kogyo Shimbun, Ltd. pp. 66–69 and 188–189.
Kanno and Uehara: "Introduction to die–cast technology" Dec. 20, 1979 (Showa 54) The Nikkan Kogyo Shimbun, Ltd. pp. 142–143.
"Mold technology" Aug. 31, 1991 (Heisei 3), Japan Die Casting Association, p. 44.
"Mold technology", vol. 12, No. 1, Jan. 1, 1997 (Heisei 9), The Nikkan Kogyo Shimbun, Ltd., pp. 100–101.
"Heat treatment" vol. 4, No. 4, Aug. 1964 (Showa 39), The Japan Society for Heat Treatment, pp. 265–271.
E. A. Herman: "Designing of die–cast mold" Oct. 30, 1986 (Showa 61), Keikinzoku Tsushin Al Co., Ltd. pp. 243–244.
Hihara, Masahiko, "Lifetime improvement of die–cast mold and measures" Sep. 21, 1994 (Heisei 6) Keikinzoku Tsushin Al Co., Ltd., p. 90.
"Revised version Die–cast technician handbook" Jul. 1, 1997, National Die Casting Co–Operative Union, pp. 132, 172, 224, 226 and 425.
"Casting defect of die–cast and measures" Dec. 20, 1996, Japan Foundry Engineering Society, pp. 77–80 and 88–93.
Patent related search result, Feb. 23, 2001, Japan Die Casting Association.
Kanno and Uehara: "Aluminum alloy die–cast/its technology and measure against defect", Dec. 15, 1988, Light Metal Publishing Co., pp. 231–287.
"Standard of die–cast terminology DCS T", Jun. 1, 1999 (Heisei 11), Japan Die Casting Association, pp. 3 and 8.
Statement of Mr. Masahiko Hihara (Dec. 11, 2003).
Experiment report by Mr. Hiroyuki Nakayamam, dated Mar. 8, 2002.
Statement of Mr. Isao Kuboki (Dec. 8, 2003).
Newsletter, "Die–Cast" No. 88, 1998, pp. 7–10.
Hihara, Masahiko (Sep. 21, 1994 (Heisei 6)). "Lifetime improvement of die–cast mold and measures" p. 90, Keikinzoku Tsushin Al Co., Ltd.
"Standard of die–cast terminology DCS T", Jun. 1, 1999 (Heisei 11), Japan Die Casting Association, p. 26.
Kanno, Tomonobu and Uehara Torazo, "Die cast technology introduction—second edition–" Mar. 20, 1971, The Nikkan Kogyo Shimbun, Ltd., p. 97.
"Standard of die–cast terminology DCS T", date unknown.
The sales brochure of Porcerax, date unknown.
Concise explanation of Reference materials 13–16 (Dec. 28, 1998).
Abstract of Doctoral thesis by Nakajima Kensuke, Sep. 19, 1990, in Nagaoka University of Technology.
"Current Technology of Tribo–coating", Feb. 18, 1998, Symposium.
[Ionics] Feb. 1983.
"Ion Implantation into Metals" Masaya Iwaki, Powder and Powder Metallurgy, vol. 35–3, Apr. 1988.
Dr. Masahiko Hihara et al., "Applications of Nitriding Processes to SKD61 Die Steels", Sep. 21, 1994.
Mold Technology, vol. 12, No. 1 (Jan. 1, 1997).
"Lifetime measures of a hot work die", Jul. 26, 2001.
Hihara, Masahiko "Lifetime improvement of die–cast mold", Feb. 28, 2003, Nikkan Kogyou, p. 97.
Web page of NDC Ltd., date unknown.
Die Cast Newspaper, Jan. 30, 2002, p. 3.
H. H. Doehler: "Die–Casting" Nov. 25, 1963 (Showa 38), The Nikkan Kogyo Shimbun, Ltd., pp. 2–3, 314–315, 334–361.
"Lifetime measures of a hot work die", Jul. 26, 2001.
Hihara, Masahiko "Lifetime improvement of die–cast mold" Feb. 28, 2003, Nikkan Kogyou, pp. 130–131.
Statement of Minoru Ikeda, Jan. 23, 2006.
H. H. Doehler: "Die–Casting" Nov. 25, 1963 (Showa 38) The Nikkan Kogyo Shimbun, Ltd., pp. 70–77.
"Die–cast technology manual" Feb. 28, 1965 (Showa 40), The Nikkan Kogyo.
Dr. Masahiko Hihara et al., "Applications of Nitriding Processes to SKD61 Die Steels" (Heisei 7) pp. 51–60, date unknown.
Decision on Opposition, Jan. 31, 2003.
Decision of Appeal, Jul. 21, 2005.
Court Decision, Jun. 28, 2006.
Declaration Under 37 CFR 1.132, dated Feb. 4, 2003.

* cited by examiner

FIGURE
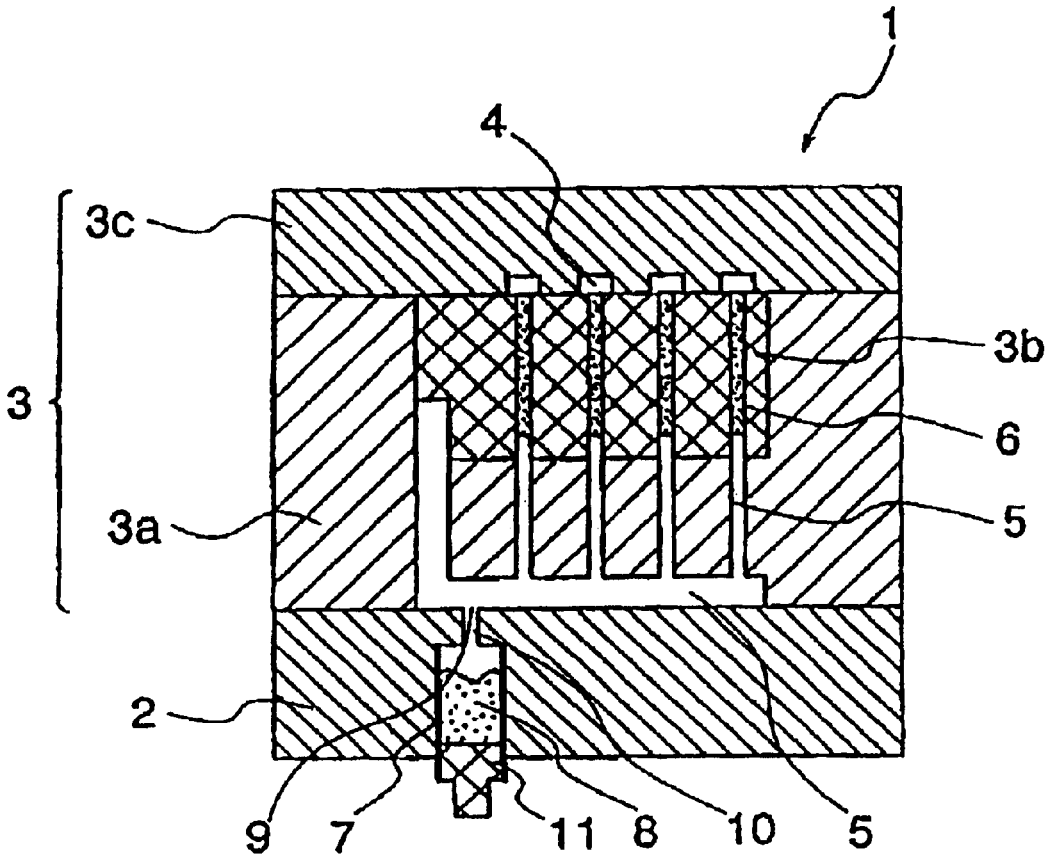
AMENDED

PROCESS FOR PRODUCING A THIN DIE-CAST MOLDED ARTICLE OF AN ALUMINUM MATERIAL

Matter enclosed in heavy brackets [ ] appears in the original patent but forms no part of this reissue specification; matter printed in italics indicates the additions made by reissue.

*CROSS REFERENCE TO RELATED APPLICATION*

*More than one reissue application has been filed for the reissue of U.S. Pat. No. 6,619,369. The reissue applications are application Ser. Nos. 11/225,842 (the present application) and 12/801,252, which is a divisional reissue of U.S. Pat. No. 6,619,369.*

BACKGROUND OF THE INVENTION

1. Field of the Invention

The present invention relates to a process for producing a thin die-cast molded article of an aluminum material. More particularly, the present invention relates to a process for producing a thin die-cast molded article of an aluminum material having a thickness of 0.4 to 1.2 mm and exhibiting an excellent appearance using a mold having a narrow gate efficiently with excellent flow of the melted metal through the gate portion.

2. Description of Related Art

Aluminum has excellent properties as a metal such as a light weight, an excellent plastic working property, excellent corrosion resistance and high electric and thermal conductivities. It is known that alloys obtained by adding copper, magnesium, zinc, silicon, lithium, nickel, chromium, manganese, iron or zirconium exhibit remarkably improved mechanical properties at the ordinary temperature and high temperatures due to hardening by formation of solid solutions, work hardening and age hardening and acquire advantageous properties such as corrosion resistance, wear resistance and low coefficients of thermal expansion. Therefore, aluminum and aluminum alloys having the advantageous properties are widely used in many fields, for example, in the fields of utensils such as cans of drinks, furnitures and interior articles; aviation and space; automobiles; electric and electronic products; vehicles; ships; and civil engineering and buildings.

As one of the processes for working aluminum materials such as aluminum and aluminum alloys, the die-cast process is well known and widely used for producing various molded articles.

The die-cast process is a casting process in which a melted material is injected into a mold made of a metal by an injecting plunger at a high speed (about 20 to 60 m/second) under a high pressure (about 30 to 200 MPa), fills the mold and solidifies rapidly. The die-cast process is advantageous in that thin cast products having a minimum thickness of about 1 mm can be produced, products having an excellent surface can be obtained with excellent accuracy of dimensions and the productivity is high.

However, since the die-cast process is conducted by injecting a melted metal at a high speed and the time of filling is as short as 0.3 seconds, the die-cast process has a drawback in that the air in the space (the cavity) of the mold and gases formed by the reactions tend to be sucked into the product and defects of pores (porosity) tend to be formed. Therefore, various processes have been developed for improving the quality. Examples of such processes include (1) the low speed filling die-cast process in which the speed of injection is lowered to 1 m/second or slower; (2) the ACURADE process in which the pressure is added in two steps to prevent formation of sink in portions having a greater thickness; (3) the local SQUEEZE process in which portions having a greater thickness are locally pressed to prevent formation of sink; (4) the vacuum die-cast process in which the pressure at the inside of the mold is lowered to decrease sucking of gases; and (5) the PF die-cast process in which the inside of the mold is filled with oxygen and sucking of gases is prevented by dispersing the entire oxygen as fine particles of oxides.

However, the above conventional technology has been developed not for producing thin products but for improving the quality of the die-cast products. The maximum thickness of the die-cast molded article of an aluminum material is about 1 mm. It is the actual present situation that no die-cast molded articles having a thickness smaller than 1 mm have been obtained.

Recently, devices having many semiconductors and IC's equipped with ultra-small electronic circuits in which inner wirings are combined together in a solid article in accordance with specific methods are increasing. The above devices and IC's have the possibility of troubles that the working of the semiconductors becomes unstable and the semiconductors may be broken due to a high temperature caused by a great amount of heat generated in the process of operation of the semiconductors. The unstable working and the fracture of the semiconductors due to the high temperature are prevented by attaching a heat radiating plate for cooling the semiconductors so that the heat of the semiconductors are released into the air by heat exchange between the heat radiating plate and the air.

As the heat radiating plate, in general, a substrate attached with numerous thin and long heat radiating pins is used. Die-cast molded articles of aluminum materials are frequently used for the above heat radiating plate. As IC is made still more compact recently, a decrease in the weight of the above heat radiating plate is desired.

For case covers of portable electronic instruments, die-cast molded articles of aluminum materials are widely used. As the size of the electronic instruments is decreasing, for example, as personal computers of the note type are more widely used, a decrease in the weight of the case cover is desired.

As the material having a light weight, magnesium materials such as magnesium having a specific gravity of 1.74 (the specific gravity of aluminum: 2.70) and magnesium alloys are known. However, molded articles of magnesium materials have drawbacks in that the articles are more expensive than the articles of aluminum materials and defect articles are produced in a greater amount than that of the articles of aluminum materials. Therefore, a molded article of an inexpensive aluminum material having a weight as light as that of the molded articles of magnesium materials is desired.

To produce a molded article of an inexpensive aluminum material having a weight as light as that of the molded articles of magnesium materials, it is necessary that the thickness of the article be reduced. However, as described above, it is difficult that a die-cast molded article of an aluminum material having a thickness smaller than 1 mm is produced in accordance with the conventional technology. Therefore, development of technology for efficiently producing a die-cast molded article of an aluminum material having a thickness smaller than 1 mm has been desired.

The present inventor studied the process for producing a die-cast molded article of an aluminum material having a thickness smaller than 1 mm and it was found that a die-cast molded article of an aluminum material having a thickness smaller than 1 mm can be obtained when one or more porous iron members which do not allow the melted metal of the aluminum material to pass but allow gases to pass and are connected to a passage of gases open to an outside are disposed in portions of members surrounding the cavity of the mold, a cavity of a mold is filled with a melted metal of the aluminum material under pressure and gases and the air are released to the outside through the porous members.

When the melted metal of an aluminum material is introduced into the mold under pressure to fill the cavity, the aluminum material is introduced through a gate. The aluminum material at the gate portion is separated from the obtained die-cast molded article after solidification. Therefore, the thinner the gate, the smaller the defect portion formed on the molded article and the better the appearance of the molded article. However, since an excessively thin gate causes poor flow of the melted metal, in general, a gate having an opening 0.6 to 1 times as much as the opening of the die-cast molded article has heretofore been used in conventional processes for producing a die-cast molded article of an aluminum material having a thickness of 1 mm or greater. In other words, the [maximum] *minimum* opening of the gate is about 0.6 mm. When the opening of the gate is smaller than this value, the flow of the melted material is insufficient and a die-cast molded article of an aluminum material having excellent quality cannot be obtained.

A gate which provides excellent flow of the melted metal even when the opening of the gate is about ½ of the thickness of the molded article has been desired in the process for producing a die-cast molded article of an aluminum material having a thickness smaller than 1 mm. It is expected that a thin die-cast molded articles of an aluminum material exhibiting excellent appearance and having excellent quality can be obtained by using a thin gate providing excellent flow of the melted metal.

SUMMARY OF THE INVENTION

The present invention has an object of providing a process for producing a thin die-cast molded article of an aluminum material exhibiting excellent appearance and excellent quality and having a thickness of 0.4 to 1.2 mm efficiently with excellent flow of a melted metal by using a narrow gate.

As the result of extensive studies by the present inventor to achieve the above object, it was found that the above object can be achieved when a mold having a gate having an opening of 0.2 mm or greater and the same as or smaller than the thickness of the molded article is used and members which have been treated by nitrogenation at the surface are used as the members constituting the gate. The present invention has been completed based on the knowledge.

The present invention provides:

(1) A process for producing a thin die-cast molded article of an aluminum material comprising filling a cavity of a mold with a melted metal of the aluminum material under pressure and producing a die-cast molded article of the aluminum material having a portion having a thickness in a range of 0.4 to 1.2 mm, wherein the mold has a gate having an opening of 0.2 mm or greater and a same as or smaller than a thickness of a portion of the die-cast molded article separated from a gate portion and members constituting the gate have been treated by nitrogenation at a surface;

(2) A process described in (1), wherein one or more porous iron members which do not allow the melted metal of the aluminum material to pass but allow gases to pass and are connected to a passage of gases open to an outside are disposed in portions of members surrounding the cavity of the mold; and (3) A process described in any one of (1) and (2), wherein members which have been treated by nitrogenation at a surface are used for constituting the cavity of the mold.

BRIEF DESCRIPTION OF THE DRAWINGS

FIG. 1 shows a sectional view of a mold for die-cast molding used in an embodiment of the process of the present invention.

The numbers in FIG. 1 have the following meanings:

1: A mold for die-cast molding
2: A fixed mold
3: A movable mold
3a: A main mold
3b: An inner mold
3c: A pressing mold
4: A passage of gases
5: A cavity for a heat radiating plate
5': A pin portion of a heat radiating plate
6: A porous member
7: A sleeve
8: A melted metal of an aluminum material
9: A gate
10: A flow route
11: A plunger chip

DESCRIPTION OF THE PREFERRED EMBODIMENTS

The aluminum material used in the process for producing a thin die-cast molded article of an aluminum material of the present invention is not particularly limited as long as the aluminum material is a metal material comprising aluminum as the main component. It is preferable that an aluminum alloy for casting is used. A suitable material can be selected from aluminum alloys for casting in accordance with the application of the die-cast molded article.

Examples of the aluminum alloy for casting include Al—Cu alloys, Al—Si alloys, Al—Mg alloys, Al—Si—Cu alloys, Al—Si—Mg alloys, Al—Co—Cu alloys, Al—Mn—Mg alloys, Al—Mn—Fe alloys, Al—Mn—Zn—Fe—Mg alloys.

In the process of the present invention, a melted metal of the above aluminum material is introduced into a mold under pressure to fill a cavity and a thin die-cast molded article of an aluminum material having a thickness of 0.4 to 1.2 mm is produced. It is not necessary that the entire molded article has a thickness of 0.4 to 1.2 mm. The molded article may have a thickness of 0.4 to 1.2 mm at a portion.

In the present invention, a mold in which a gate has an opening of 0.2 mm or greater and the same as or smaller than the thickness of the molded article and members treated by nitrogenation at the surface are used as the members constituting the gate is used. When the opening of the gate is smaller than 0.2 mm, the flow of the melted metal is poor and the molded article having excellent quality cannot be obtained. When the opening of the gate exceeds the thickness of the molded article, the molded article tend to have defects when the molded article is separated from the gate and the molded article having excellent quality cannot be obtained.

As the material of the member constituting the gate, materials which can be treated by nitrogenation such as cast iron, carbon iron, alloy steel and steel for nitrogenation containing Al, Cr or V can be used.

The process for nitrogenation is not particularly limited. A suitable process can be selected from conventional processes for nitrogenation to provide wear resistance.

As the process for nitrogenation, various processes have been developed. Among such processes, (1) the process for nitrogenation in a salt bath, (2) the process for nitrogenation in a gas, (3) the soft process for nitrogenation in a gas and (4) the process for nitrogenation with ions are preferable.

In the process for nitrogenation in a salt bath of process (1), a member for the treatment is dipped into a bath of a mixed salt containing an alkali cyanate such as sodium cyanate and potassium cyanate and treated by heating at a temperature of about 500 to 700° C. Nitrides are formed with nitrogen formed by decomposition of the alkali cyanate.

Among various processes for nitrogenation in a salt bath, the Tufftride process is preferable. In the Tufftride process, a bath of a mixed salt containing an alkali cyanate, an alkali cyanide and an alkali carbonate is used. A member for the treatment is dipped into the bath of a mixed salt and nitrides are formed under heating while a gas containing oxygen such as the air is blown into the bath. Then, the member treated by nitrogenation as described above is, in general, dipped into an oxidizing bath at 350 to 450° C. so that the material is subjected to the neutralization and the quenching treatment.

In the process for nitrogenation in a gas of process (2), a member for the treatment is heated at a temperature of about 500 to 550° C. under a stream of ammonia at a gas pressure of about 8,000 to 10,000 Pa. In this process, ammonia is decomposed on the surface of the member for the treatment and nitrides are formed with atomic nitrogen.

In the soft process for nitrogenation in a gas of process (3), a member for the treatment is heated at a temperature of about 550 to 600° C. under a stream of a gas which contains an ammonia gas and a mixed gas composed of 40% by volume of $N_2$, 40% by volume of $H_2$ and 20% by volume of $CO_2$ in amounts such that the ratio of the amounts by volume of the ammonia gas to the mixed gas is about 50:50. In this process, the cementation and the nitrogenation take place simultaneously. The nitrogenation is promoted by the cementation and the time of the treatment can be decreased from that in the process for nitrogenation in a gas of process (2).

In the process for nitrogenation with ions of process (4), under the atmosphere of a mixed gas containing nitrogen and hydrogen at a pressure of about 0.1 to 2.5 MPa in a closed container, a member for the treatment is used as the cathode and the wall of the container is used as the anode and a direct current voltage of about 300 to 1,500 V is applied. In this process, glow discharge takes place at portions close to the surface of the member for the treatment and, as the result, the $N_2$ gas is ionized at portions close to the cathode. The $N^+$ ion formed by the ionization is accelerated to a high speed and collides against the member for the treatment and nitrides are formed on the surface.

By nitrogenation on the surface of the members constituting the gate in accordance with the above processes, the flow of a melted metal is improved by a factor of 1.5 to 2 from the flow without the treatment by nitrogenation when the melted metal of the aluminum material is introduced through the gate to fill the cavity. Wear resistance of the members constituting the gate is also improved and durability is improved.

The mold used in the present invention is not particularly limited as long as the members constituting the gate are treated by nitrogenation at the surface, the gate has an opening of 0.2 mm or greater and the same as or smaller than the thickness of the molded article and a thin die-cast molded article of an aluminum material having a thickness of 0.4 to 1.2 mm can be produced. It is preferable that the mold has a cavity formed by fitting a fixed mold and a movable mold to each other and one or more porous iron members which do not allow the melted metal of the aluminum material to pass but allow gases to pass and are connected to a passage of gases open to the outside are disposed in portions of members surrounding the cavity of the mold.

The porous members are disposed to release gases such as gasses derived from lubricants present in a melted metal and gases formed by the reactions and the air in the cavity to the outside so that a decrease in the flow of a melted metal caused by the gasses and the air in the cavity is prevented when the melted metal of the aluminum material is introduced into the mold under pressure to fill the cavity. Therefore, it is necessary that the porous member does not allow the melted metal of the aluminum material to pass but allows the gasses to pass. Iron is used as the material of the porous members due to durability at the temperature of the melted metal of the aluminum material, a suitable mechanical strength and weldability to the members of the mold.

The porous member is commercially available, for example, as "PORCERAX" (a trade name; manufactured by SHINTO KOGYO Co., Ltd.).

The porous members are disposed in portions of members surrounding the cavity. The position for disposing the porous member is not particularly limited and can be suitably selected in accordance with the type of the die-cast molded article. For example, when the die-cast molded article is a heat radiating plate having a plurality of heat radiating pins disposed on a substrate, it is advantageous that the porous members are disposed at portions of the cavity corresponding to the tips of the heat radiating pins. When the die-cast molded article is a case cover of a portable electronic instrument, it is advantageous that the porous members are disposed at portions of members of the mold along the flow of the melted metal in the cavity. A single porous iron member may be disposed or a plurality of porous iron members may be disposed, where necessary.

The cavity is formed by fitting a fixed mold and a movable mold to each other. To form the cavity, the inner surface of one or both of the fixed mold and the movable mold may be directly shaped concavely in the form of the cavity or the inner surface of an inner molded which is fitted into the main mold may be shaped concavely in the form of the cavity.

A preferred embodiment of the present invention will be described with reference to the attached figure using production of a heat radiating plate as an example.

FIG. 1 shows a sectional view of a mold for die-cast molding (for producing a heat radiating plate) used in an embodiment of the process of the present invention. A mold for die-cast molding 1 is constituted with a fixed mold 2 and a movable mold 3. The movable mold 3 is constituted with a main mold 3a, an inner mold 2 and a pressing mold 3c. The main mold 3a is concavely shaped to form a cavity 5 for a heat radiating plate. Into the main mold 3a, an inner mold 3b is fitted and fixed with bolts. In the inner mold, slits for connection to portions for heat radiating pins 5' of the cavity 5 and porous members 6 contacting the slits are disposed. Each porous member 6 is made of iron, has the property of not allowing a melted metal of the aluminum material to pass but allowing gases in the cavity to pass and is connected to a passage of gases 4 which is disposed on the pressing mold 3c and open to the outside.

The cavity 5 is connected to a gate 9 which has been treated by nitrogenation and has an opening in the range described above. The inside of the gate 9 is connected continuously to the inside of a sleeve 7 via a flow route 10. In the sleeve 7, a plunger chip 11 for injecting a melted metal 8 in the sleeve into the cavity under a pressure of 500 to 1,000 kg/cm$^2$ is disposed.

When a die-cast molded article of an aluminum material is produced, the main mold 3a into which the inner mold 3b is fitted is heated by a heater which is not shown in the figure at a temperature which allows the molding to proceed. The members forming the cavity 5 are coated with a mold release to facilitate taking out the produced die-cast molded article and the fixed mold 2 and the movable mold 3 are closed. The melted metal of an aluminum material (the temperature: about 680 to 800° C.) 8 contained in the sleeve 7 is injected from the gate 9 via the flow route 10 into the cavity 5 by the plunger chip 11 under a pressure of 500 to 1,000 kg/cm$^2$ to fill the cavity. Gases formed by the injection of the melted metal under pressure and the air inside the cavity are smoothly released to the outside through the porous members 6 and the passage of gases 4. Therefore, the melted metal of an aluminum material is easily introduced into the mold to fill the cavity and easily flows into the portion corresponding to the tips of the heat radiating pins 5'.

When the filling of the melted metal of the aluminum material into the cavity is completed as described above, the mold for die-cast molding 1 is cooled in 5 to 8 seconds by a cooling apparatus which is not shown in the figure and the fixed mold 2 and the movable mold 3 are opened. The die-cast molded article is separated from the main mold 1 by pushing by an ejector pin which is not shown in the figure and the gate portion is separated from the molded article.

The heat radiating plate thus produced has excellent quality without defects such as burrs and pores. In accordance with this process, a heat radiating plate having heat radiating pins having a thickness smaller than 1 mm and preferably about 0.4 to 0.8 mm can be easily produced.

As described above, by disposing the porous members, the flow of the melted metal in the cavity is improved and a thin die-cast molded article of an aluminum material having excellent quality can be obtained. To further improve the flow property, where desired, the surface of the members constituting the cavity may be treated by nitrogenation in the same manner as that for the members constituting the gate.

To summarize the advantages of the present invention, in accordance with the process of the present invention, a thin die-cast molded article of an aluminum material having a thickness of 0.4 to 1.2 mm and exhibiting excellent appearance can be produced efficiently with excellent flow through the gate portion by using a mold having a narrow gate.

The process of the present invention can be advantageously applied for producing heat radiating plates and case covers of portable electronic instruments.

EXAMPLES

The present invention will be described more specifically with reference to an example in the following. However, the present invention is not limited to the example.

Example 1

Using a mold having a gate having an opening of 0.3 mm, which is shown in FIG. 1, as the mold, a die-cast heat radiating plate of an aluminum material having a plurality of heat radiating pins which had a thickness of 0.5 mm, a height of 7 mm and a width of 100 mm and were disposed on a substrate was produced.

The surface of the members constituting the gate made of steel SKD-61 were treated by nitrogenation in a salt bath in accordance with the Tufftride process as follows.

The members for the treatment were dipped into a mixed salt bath containing sodium cyanate, potassium cyanide and sodium carbonate and treated by heating at 600° C. for 60 minutes while the air was blown into the bath. The treated members were dipped into an oxidizing bath at 450° C. for 30 minutes and then cooled.

An Al—Mn—e alloy (DM2) was used as the aluminum material and a heat radiating plate was produced in accordance with the process described above. A heat radiating plate having heat radiating pins having a thickness of 0.5 mm and exhibiting excellent quality was obtained without defects such as burr and pores. The temperature of the melted metal was 740° C., the pressure of injection of the melted metal was 650 kgf/cm$^2$ and the time of injection was 0.2 seconds. The flow of the melted metal through the gate was excellent.

Another heat radiating plate was produced in accordance with the same procedures as those conducted above except that a mold having a gate having an opening of 0.4 mm was used. The flow of the melted metal through the gate was excellent.

Comparative Example 1

In accordance with the same procedures as those conducted in Example 1 except that the surface of the members constituting the gate was not treated by nitrogenation, a die-cast heat radiating plate of an aluminum material having a plurality of heat radiating pins having a thickness of 0.5 mm, a height of 7 mm and a width of 100 mm and disposed on a substrate was produced.

As the result, the temperature of the melted metal was 740° C., the pressure of injection of the melted metal was 900 kgf/cm$^2$ and the time of injection was 0.3 seconds. The flow of the melted metal through the gate was poor with fluctuations during the molding. The obtained heat radiating plate was not uniform and some of the heat radiating pins had a height of 7-(0.5 to 3.5) mm in contrast to the height of 7 mm in the product obtained in Example 1.

What is claimed is:

1. A process for producing a thin die-cast molded article of an aluminum alloy for casting comprising filling a cavity of a mold with a melted metal of the aluminum alloy for casting under pressure and producing a die-cast molded article of the aluminum alloy for casting having a portion having a thickness in a range of 0.4 to 1.2 mm, wherein [the] *said* mold has a gate having an opening of 0.2 mm or greater and a same as or smaller than a thickness of [a] *an edge* portion of [the] *said* die-cast molded article [separated from a] *adjacent to said* gate [portion] and [members] *wherein a member* constituting [the] *said* gate [have been treated by nitrogenation at a surface] *has a nitrogenation layer for providing improved fluidity for the melted metal of the aluminum alloy at said gate when introduced into said cavity*.

2. A process according to claim 1, wherein members which have been treated by nitrogenation at a surface are used for constituting the cavity of the mold.

3. A process according to claim 1, wherein one or more porous iron members which do not allow the melted metal of the aluminum alloy for casting to pass but allow gases to pass and are connected to a passage of gases open to an outside are disposed in portions of members surrounding the cavity of the mold.

4. A process according to claim 3, wherein members which have been treated by nitrogenation at a surface are used for constituting the cavity of the mold.

5. A process according to claim 1, wherein the aluminum alloy for casting is one selected from Al—Cu alloys, Al—Si alloys, Al—Mg alloys, Al—Si—Cu alloys, Al—Si—Mg alloys, Al—Co—Cu alloys, Al—Mn—Mg alloys, Al—Mn—Fe alloys, and Al—Mn—Zn—Fe—Mg alloys.

*6. A process for producing a thin die-cast molded article of an aluminum material for casting comprising filling a cavity of a mold with a melted metal of the aluminum material for casting under pressure and producing a die-cast molded article of the aluminum material for casting having a portion having a thickness in a range of 0.4 to 1.2 mm, wherein said mold has a gate having an opening of 0.2 mm or greater and a same as or smaller than a thickness of an edge portion of said die-cast molded article adjacent to said gate and wherein a member constituting said gate has a nitrogenation layer for providing improved fluidity for the melted metal of the aluminum material at said gate when introduced into said cavity.*

*7. A process according to claim 6, wherein members which have been treated by nitrogenation at a surface are used for constituting the cavity of the mold.*

*8. A process according to claim 6, wherein one or more porous iron members which do not allow the melted metal of the aluminum material for casting to pass but allow gases to pass and are connected to a passage of gases open to an outside are disposed in portions of members surrounding the cavity of the mold.*

*9. A process according to claim 8, wherein members which have been treated by nitrogenation at a surface are used for constituting the cavity of the mold.*

*10. A process according to claim 6, wherein the aluminum material for casting comprises a material selected from a group consisting of Al—Cu alloys, Al—Si alloys, Al—Mg, alloys, Al—Si—Cu alloys, Al—Si—Mg alloys, Al—Co—Cu alloys, Al—Mn—Mg alloys, Al—Mn—Fe alloys, and Al—Mn—Zn—Fe—Mg alloys.*

*11. A process according to claim 6, wherein the gate of the mold has an opening of 0.6 mm or smaller.*

* * * * *